(12) United States Patent
Reed et al.

(10) Patent No.: US 7,251,661 B1
(45) Date of Patent: Jul. 31, 2007

(54) MOVABLE OBJECTS IN A DATABASE

(75) Inventors: Michael L. Reed, San Diego, CA (US); Kevin D. Virgil, Oceanside, CA (US)

(73) Assignee: NCR Corp., Dayton, OH (US)

( * ) Notice: Subject to any disclaimer, the term of this patent is extended or adjusted under 35 U.S.C. 154(b) by 192 days.

(21) Appl. No.: 10/112,419

(22) Filed: Mar. 29, 2002

(51) Int. Cl.
  *G06F 17/30* (2006.01)
(52) U.S. Cl. .................. 707/101; 707/102
(58) Field of Classification Search .............. 707/1, 707/2, 3, 4, 5, 6, 7, 8, 9, 10, 203, 204; 711/5, 711/173; 710/15, 109
See application file for complete search history.

(56) References Cited

U.S. PATENT DOCUMENTS

| | | | |
|---|---|---|---|
| 6,269,382 B1 * | 7/2001 | Cabrera et al. | 707/204 |
| 6,330,621 B1 * | 12/2001 | Bakke et al. | 710/5 |
| 6,374,266 B1 * | 4/2002 | Shnelvar | 707/204 |
| 6,401,183 B1 * | 6/2002 | Rafizadeh | 711/173 |
| 6,678,752 B1 * | 1/2004 | Ashton et al. | 710/15 |
| 6,718,427 B1 * | 4/2004 | Carlson et al. | 711/5 |

* cited by examiner

*Primary Examiner*—Yicun Wu
(74) *Attorney, Agent, or Firm*—Frommer Lawrence & Haug LLP; John Cowart

(57) ABSTRACT

Methods and apparatus for moving data objects in a database system. In one implementation, a database system includes: one or more data storage facilities for use in storing data composing records in tables of a database, where at least one data storage facility includes at least two types of data storage devices each belonging to a respective data storage class, and at least one data storage facility stores one or more data objects each including one or more migration parameters; one or more processing modules configured to manage the data stored in the data-storage facilities and to move data objects among data storage devices in different data storage classes according to the migration parameters of the data objects; and a database management component configured to coordinate the operation of the processing modules.

49 Claims, 3 Drawing Sheets

MOVABLE OBJECTS IN A DATABASE

BACKGROUND

In a typical database system supporting SQL (Structured Query Language), table rows can include one or more fields that are user defined type (UDT) fields. One type of UDT is a UDT structured type. The UDT structured type shares many properties in common with the C-language "struct." Both a C-language struct and a UDT structured type can be declared to be composed of any number of data members which can be either homogeneous or heterogeneous with respect to their data types. Both a C-language struct and a UDT structured type can also be nested, containing data members which are themselves structured types. The declaration of a UDT structured type is entered into the DBS system using SQL Data Definition Directives. One type of UDT used to support large objects is a BLOB UDT ("Binary Large OBject").

A typical database system tracks the age of stored data, such as by using timestamps. Data "ages" as it resides in storage without being accessed or used. Typically, the database system periodically evaluates stored data and removes data from storage that has exceeded a threshold age.

SUMMARY

The present disclosure provides methods and apparatus for moving data objects in a database system. In one implementation, a database system includes: one or more data storage facilities for use in storing data composing records in tables of a database, where at least one data storage facility includes at least two types of data storage devices each belonging to a respective data storage class, and at least one data storage facility stores one or more data objects each including one or more migration parameters; one or more processing modules configured to manage the data stored in the data-storage facilities and to move data objects among data storage devices in different data storage classes according to the migration parameters of the data objects; and a database management component configured to coordinate the operation of the processing modules.

In another implementation, a method of moving data objects in a database system includes: evaluating one or more migration parameters for a data object stored in a current data storage device in a database system, where the current data storage device is a member of a first data storage class; applying the migration parameters for the data object to one or more migration controls to indicate a target data storage class; and if the target data storage class is different from the first data storage class, moving the data object to a data storage device that is a member of the target data storage class.

DETAILED DESCRIPTION

Figure 1:
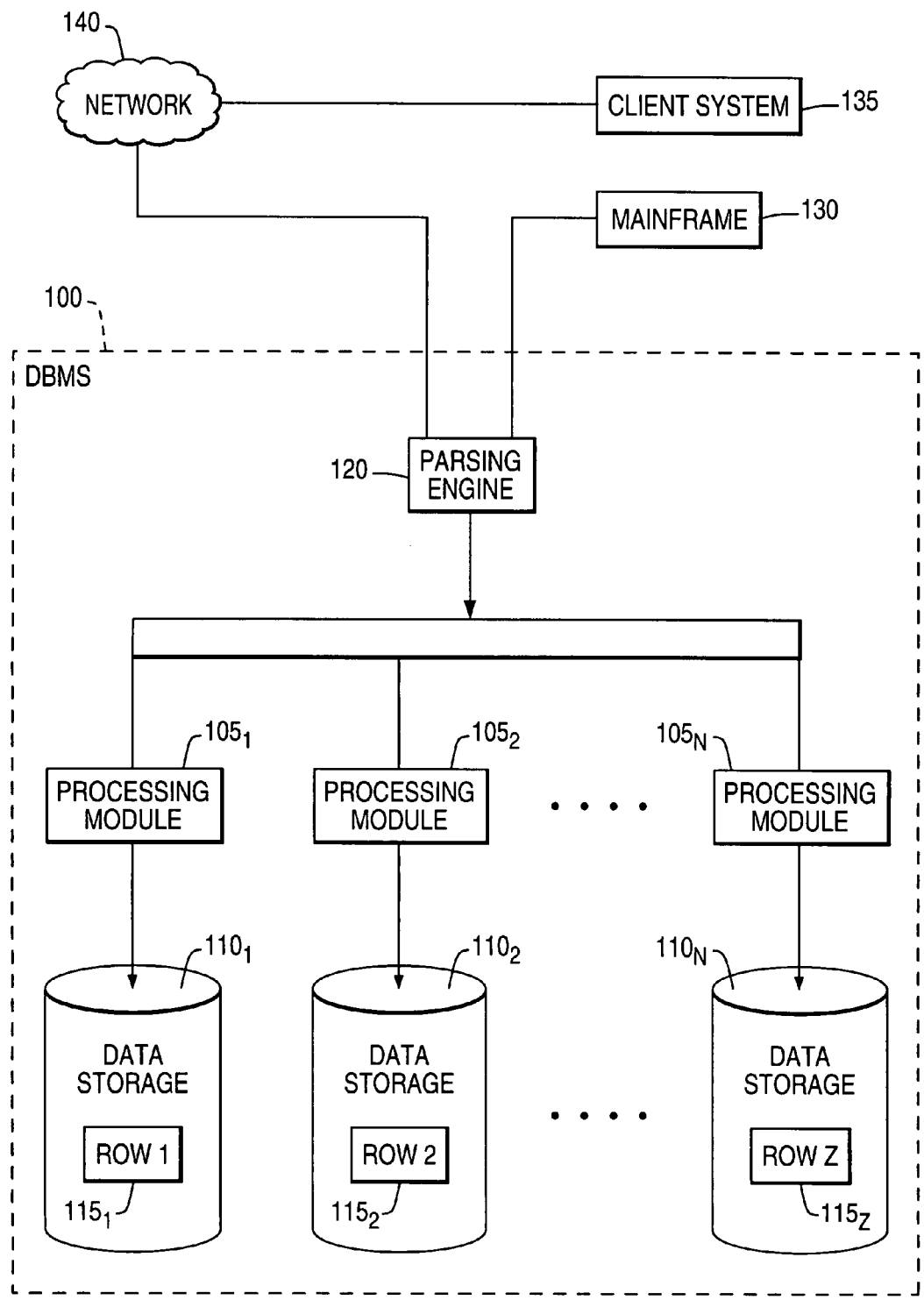
FIG. 1 shows a sample architecture of a database management system.

FIG. 1 shows a sample architecture of a database management system (DBMS) 100. In one implementation, DBMS 100 is a parallel architecture, such as a massively parallel processing (MPP) architecture. DBMS 100 includes one or more processing modules $105_{1 \ldots N}$ that manage the storage and retrieval of data in corresponding data-storage facilities $110_{1 \ldots N}$. Each of processing modules $105_{1 \ldots N}$ manages a portion of a database that is stored in a corresponding one of data storage facilities $110_{1 \ldots N}$. Each of data storage facilities $110_{1 \ldots N}$ includes one or more storage devices, such as disk drives.

As described below, DBMS 100 stores and retrieves data for records or rows in tables of the database stored in data storage facilities $110_{1 \ldots N}$. Rows $115_{1 \ldots Z}$ of tables are stored across multiple data storage facilities $110_{1 \ldots N}$ to ensure that system workload is distributed evenly across processing modules $105_{1 \ldots N}$. A parsing engine 120 organizes the storage of data and the distribution of rows $115_{1 \ldots Z}$ among processing modules $105_{1 \ldots N}$ and data storage facilities $110_{1 \ldots N}$. In one implementation, parsing engine 120 forms a database management component for DBMS 100. Parsing engine 120 also coordinates the accessing and retrieval of data from data storage facilities 11..N in response to queries received from a user at a connected mainframe 130 or from a client computer 135 across a network 140. DBMS 100 usually receives queries in a standard format, such as the Structured Query Language (SQL) put forth by the American Standards Institute (ANSI). In one implementation, DBMS 100 is a Teradata Active Data Warehousing System available from NCR Corporation.

SQL provides various defined types of data and methods for accessing and manipulating data. SQL also supports user defined types (UDT) and user defined methods (UDM). In one implementation, DBMS 100 supports SQL and includes support for UDT's and UDM's.

Figure 2:
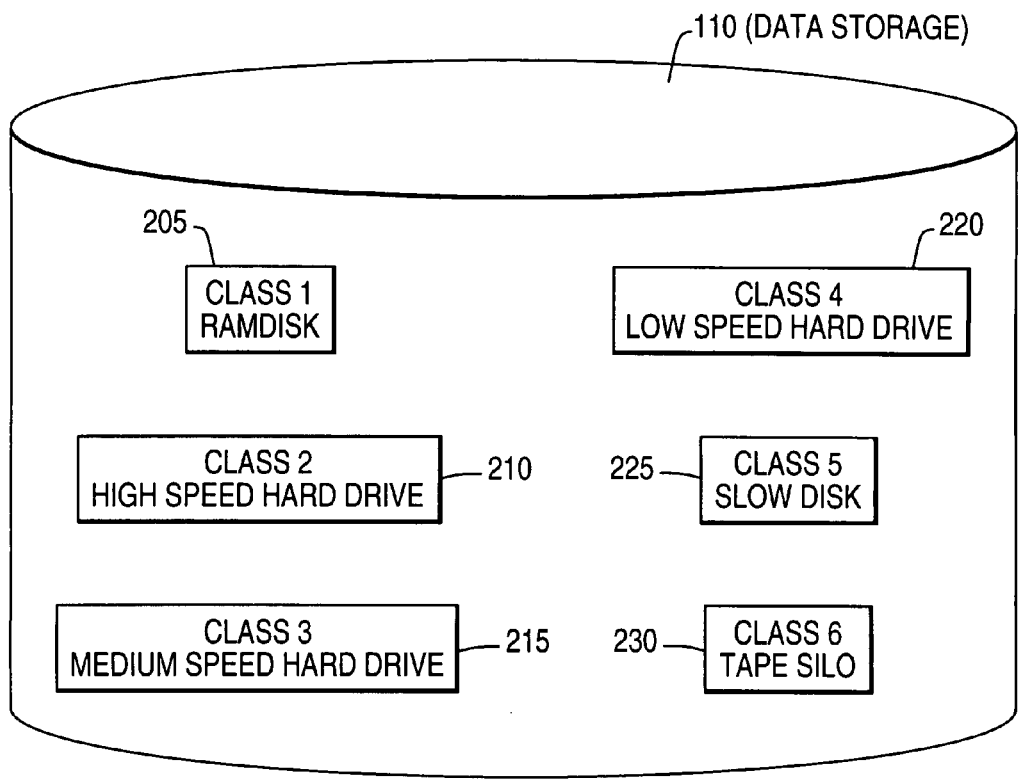
FIG. 2 shows a data storage facility including six types of data storage devices.

One or more of data storage facilities $110_{1 \ldots N}$ include multiple types of data storage devices. FIG. 2 shows a data storage facility 110 including six types of data storage devices: a ramdisk 205, a high speed hard drive 210 (e.g., a drive with a speed greater than 7200 rpm), a medium speed hard drive 215 (e.g., a drive with a speed from 5400 to 7200 rpm), a low speed hard drive 220 (e.g., a drive with a speed less than 5400 rpm), a slow disk drive 225 (e.g., an optical drive or a read/write CD drive), and a tape silo 230.

Each data storage device belongs to a class of data storage and each data storage class includes zero or more storage devices. Data storage devices are divided into classes according to speed. For example, in one implementation, data storage devices are divided into six classes: very fast, fast, normal, slow, very slow, extremely slow. Referring to FIG. 2, ramdisk 205 is class 1 (very fast), high speed hard drive 210 is class 2 (fast), medium speed hard drive 215 is class 3 (normal), low speed hard drive 220 is class 4 (slow), slow disk drive 225 is class 5 (very slow), and tape silo 230 is class 6 (extremely slow). In another implementation, data storage classes are based on different criteria, such as cost or size of the data storage. Each data storage device stores data indicating the data storage device's class. DBMS 100 uses the storage classes to determine where to store data. For example, in one implementation, DBMS 100 stores more important and frequently accessed data on faster data storage devices in one class, and less frequently accessed data on slower storage devices in another class.

Different data storage facilities $110_{1 \ldots N}$ can have more or less classes and types of data storage devices, as well as different classes and types of data storage devices than those shown in FIG. 2. In an alternative implementation, each data storage facility $110_{1 \ldots N}$ includes one type of data storage device for one storage class and one or more data storage facilities $110_{1 \ldots N}$ can access one or more types of data storage devices in other classes that are commonly accessible within DBMS 100. For example, in one implementation, each data storage facility $110_{1 \ldots N}$ includes a respective high speed hard drive and DBMS 100 includes a low speed hard drive and a tape silo that each of data storage facilities $110_{1 \ldots N}$ can access. In other implementations, combinations of distributed and centralized storage within DBMS 100 can be used.

In one implementation, a data storage facility 110 includes a data reference table as a storage class. Each entry in the data reference table indicates a remote storage location outside the data storage facility 110. In one implementation, the remote storage location is a data storage (e.g., a hard drive or RAID) within DBMS 100 that is accessible by each of data storage facilities $110_{1 \ldots N}$. In another implementation, the remote storage location is a data storage device outside of DBMS 100 that is accessible across a network connection, such as network 140. In this case, storage similar to that described in "REMOTE DATABASE ACCESS THROUGH A TABLE ENTRY," application Ser. No. 10/112,468 (filed on Mar. 29, 2002; the disclosure of which is incorporated herein by reference, for remote database access can be used.

DBMS 100 uses the multiple classes of data storage devices to store data according to different levels of priority or importance. Client system 135 or mainframe 130 selects an appropriate storage class for data and directs DBMS 100 to migrate the data to the selected storage class, such as by providing appropriate SQL statements to DBMS 100. Parsing engine 120 receives the requests from client system 135 and causes processing modules $105_{1 \ldots N}$ to migrate data stored in or associated with their respective data storage facilities $110_{1 \ldots N}$ among the classes of data. As the importance of data shifts, client system 135 causes DBMS 100 to store more important data on faster types of data storage devices. As data becomes less important, client system 135 requests DBMS 100 to migrate the data to a storage class using slower storage devices. Client system 135 controls migration using migration parameters. Client system 135 evaluates the migration parameters for data and applies the migration parameters to migration controls, such as tables. For example, in one implementation, client system 135 migrates data to slower storage when the data is accessed less often. In this case, client system 135 treats data that is accessed more often as more important. DBMS 100 tracks accesses to data using timestamps indicating the last time the data was accessed. Client system 135 requests the timestamps from DBMS 100. This timestamp is an example of a migration parameter. To determine whether and where to migrate data, client system 135 compares the data's timestamp to a timestamp table. The table indicates a class of data storage for different ranges of timestamps (e.g., a first range of values indicate a first type of storage, a second range of values indicate a second type of storage, and so on). This timestamp table is an example of a migration control. To migrate data, client system 135 applies the timestamp for the data to the timestamp table and sends a request to DBMS 100 to move the data to a storage device in the class of data storage indicated by the table.

DBMS 100 supports a structured UDT defining a movable object called a MOB. The MOB UDT extends the large object UDT, BLOB. A MOB object inherits data and methods from the BLOB UDT. A MOB object stores a BLOB and one or more migration parameters that client system 135 uses to determine when and where to migrate the MOB object.

Figure 3:
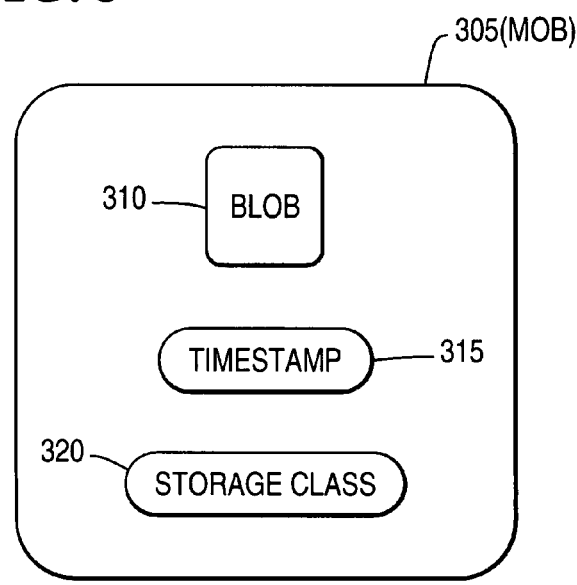
FIG. 3 shows an example of a MOB UDT type and its data members represented by a MOB object.

FIG. 3 shows an example of a MOB UDT type and its data members represented by a MOB object 305. MOB object 305 includes a BLOB object member 310, a timestamp member 315, and a storage class member 320. BLOB object member 310 stores a BLOB object. Timestamp member 315 stores a timestamp value, indicating the last time the BLOB object in BLOB object member 310 was accessed. Storage class member 320 stores an integer indicating the class of data storage where MOB object 305 is stored. An example of a type definition for a MOB UDT is:

| | |
|---|---|
| Create Type MOB { | |
| Alob: | BLOB, |
| Stamp: | Timestamp, |
| Sclass: | Integer |
| } | | where Alob is the BLOB object member 310, Stamp is the timestamp member 315, and Sclass is the storage class member 315. In alternative implementations, a MOB object stores different or additional migration parameters, such as a size value. Alternatively, DBMS 100 can derive information using methods of the MOB objects, such as using a sizeof( ) method to determine the size of a MOB object.

The MOB UDT defines a UDM UdtMobMigrate for migrating a MOB object from one data storage class to another. The prototype for the UDM UdtMobMigrate is:

UdtMobMigrate (tothistypeofstorage: Integer)

The parameter tothistypeofstorage indicates a class of data storage to which to move the MOB object. For example, as described above referring to FIG. 2, DBMS 100 supports data classes 1 through 6 and so tothistypeofstorage is an integer value between 1 and 6. DBMS 100 calls UdtMobMigrate in response to a request from client system 135 to migrate a MOB object to another class of storage.

Client system 135 requests DBMS 100 to migrate data objects in various circumstances in different implementations. In one implementation, client system 135 periodically evaluates each MOB object stored in DBMS 100 for migration. Client system 135 requests migration parameter data from DBMS 100 to evaluate the MOB objects. Each processing module 105 provides migration parameter data for the MOB objects stored in the data storage devices of the corresponding data storage facility 110. Processing modules $105_{1 \ldots N}$ can process requests for migration parameters in parallel and also process requests to migrate their data in parallel, coordinating the use of any common storage. Client system 135 causes DBMS 100 to migrate MOB objects which are not currently stored in the proper class of storage as shown by applying the migration parameters to the migration controls. In another implementation, client system 135 causes DBMS 100 to migrate MOB objects from one type of storage to another when the first type of storage has changed class, such as due to an upgrade in available hardware or when the migration controls have been changed. Accordingly, by applying a MOB object's migration parameters to appropriate migration controls, whether a migration parameter has changed (e.g., the MOB object has aged), or a migration control has changed (e.g., a new class of storage is available), client system 135 can ensure that the MOB object is stored or migrated to the proper class of storage.

Figure 4:
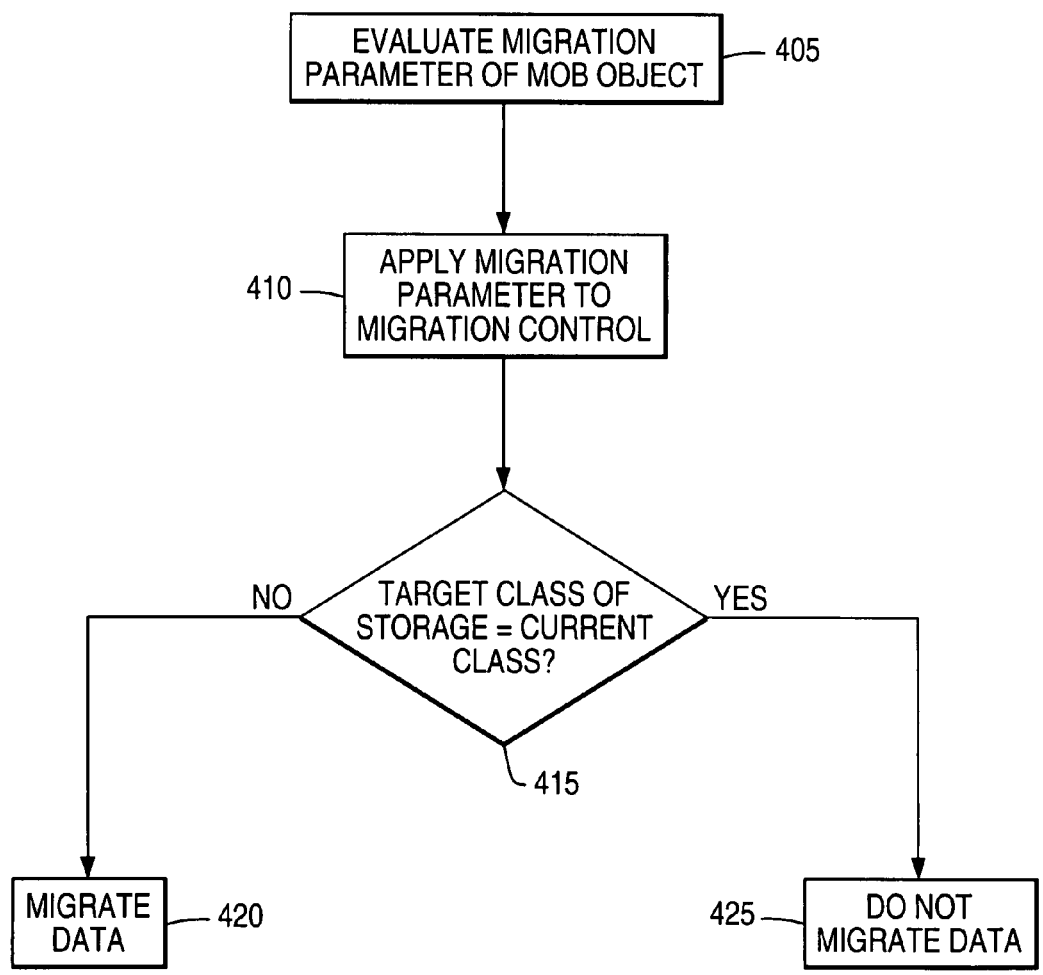
FIG. 4 is a flowchart of evaluating and migrating a MOB object.

FIG. 4 is a flowchart of evaluating and migrating a MOB object. FIG. 4 is described below referring to an implementation using MOB objects as shown in FIG. 3. Client system requests and evaluates the migration parameter of a MOB object, block 405. Client system 135 places a request for the migration parameter to DBMS 100, such as in an SQL statement. Parsing engine 120 parses the request and causes a processing module 105 to request the timestamp value from the MOB object (e.g., from timestamp member 315 in FIG. 3). Processing module 105 returns the migration parameter to client system 135. In an implementation where the MOB object has multiple migration parameters, processing module 105 acquires and returns each of the migration parameters for the MOB object. Client system 135 applies the migration parameter to the corresponding migration control to determine a target class of data storage, block 410. The target data storage class is the storage class where the MOB object is to be stored. Client system 135 uses a timestamp table as a migration control. The timestamp table corresponds ranges of timestamp values to respective target classes of storage. For example, referring to classes 1 through 6 described above referring to FIG. 2, according to the timestamp table, for timestamp values between 0 and 1 hour, the target class is class 1 (i.e., ramdisk 205 in FIG. 2). For timestamp values between 1 hour and 6 hours, the target class is class 2 (i.e., high speed hard drive 210 in FIG. 2), and so on. After determining the target class, client system 135 compares the target class to the current class of storage storing the MOB object, block 415. As with the migration parameter, client system 135 requests the current class of storage from the MOB object (e.g., from storage class member 320 in FIG. 3) through parsing engine 120 and processing module 105. Alternatively, client system 135 requests the current storage class at the same time as requesting the migration parameter. If the current class and the target class are different, client system 135 requests DBMS 100 to migrate the MOB object to a storage device in the target class, block 420. Parsing engine 120 passes the request to migrate the MOB object to processing module 105, and processing module 105 calls the UDM UdtMobMigrate for the MOB object, passing the target class as a parameter, to migrate the MOB object. In one implementation, UDM UdtMobMigrate requests an appropriate storage device for the target class from the processing module 105. UDM UdtMobMigrate moves the MOB object to the returned storage device. If the current class and the target class are the same, client system 135 does not request to move the MOB object, block 425.

In an alternative implementation, client system 135 always sends a request to migrate the MOB object to a target class and processing module 105 determines whether to move the MOB object or not. Client system 135 requests the migration parameter from DBMS 100. Client system 135 applies the returned migration parameter to a migration control to determine a target storage class. Client system 135 sends a request to DBMS 100 to migrate the MOB object to the target class. Parsing engine 120 passes the request to migrate the MOB object to processing module 105, and processing module 105 calls the UDM UdtMobMigrate, passing the target class as a parameter. In UdtMobMigrate, processing module 105 compares the target class to the current storage class for the MOB object (rather than client system 135 performing the comparison, as described). If the target class and current class are different, processing module 105 selects a storage device in the target class and moves the MOB object to the selected storage device. If the target class and the current class are the same, processing module does not move the MOB object.

In another implementation, client system 135 uses a conditional request to migrate a MOB object that meets one or more conditions. In this case, one or more migration controls are embedded within the conditional migrate request as conditions to be met. In addition, the target class for the embedded migration control is also included in the conditional migration request. Accordingly, if each embedded migration control is met, a migrate request is generated using the embedded target class. A conditional migrate request can indicate multiple rows and so result in more than one MOB object being migrated.

Client system 135 sends the conditional migrate request to DBMS 100, including at least one migration control and a target class. DBMS 100 passes the request to parsing engine 120. Parsing engine 120 parses the request and generates an execution plan for a processing module 105. Parsing engine 120 passes the execution plan, including the embedded migration control(s) and target class, to processing module 105. Processing module 105 requests from the MOB object the migration parameter(s) corresponding to the embedded migration controls (e.g., from timestamp member 315 in FIG. 3). Processing module 105 applies each migration parameter to the corresponding migration control in the conditional migrate request. If each migration control is met (e.g., the timestamp value is within a range supplied in the conditional migrate request), processing module 105 calls UdtMobMigrate, passing the embedded target class as a parameter. In UdtMobMigrate, processing module 105 compares the target class to the current storage class for the MOB object (rather than client system 135 performing the comparison, as described). If the target class and current class are different, processing module 105 selects a storage device in the target class and moves the MOB object to the selected storage device. If the target class and the current class are the same, processing module does not move the MOB object.

The following statement is an example of a conditional migrate request:

UPDATE mytable

SET mymob=mymob.UdtMobMigrate (2)

WHERE mymob.getTimeStamp( ) BETWEEN 1_hour AND 6_hours;

This conditional migrate request requests DBMS 100 to migrate a MOB object (mymob) to a storage device within storage class 2 (SET mymob=mymob.UdtMobMigrate (2)) if the timestamp for the MOB object is between 1 and 6 hours (WHERE mymob.getTimeStamp( ) BETWEEN 1_hour and 6_hours).

The various implementations of the invention are realized in electronic hardware, computer software, or combinations of these technologies. Most implementations include one or more computer programs executed by a programmable computer. For example, referring to FIG. 1, in one implementation, DBMS 100 includes one or more programmable computers implementing processing modules $105_{1 \ldots N}$, data storage facilities $110_{1 \ldots N}$, and parsing engine 120. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations based on a DBMS using a massively parallel processing (MPP) architecture, other types of database systems, including those that use a symmetric multiprocessing (SMP) architecture, are also useful in carrying out the invention. Accordingly, the present invention is not limited to only those implementations described above.

What is claimed is:

1. A method for moving a data object in a database system, wherein the data object includes one or more migration parameters and first data storage class information indicating a class of data storage in which the data object is stored, the method comprising:

receiving the one or more migration parameters;

receiving the first data storage class information indicating the class of data storage in which the data object is stored;

applying the one or more migration parameters for the data object to one or more migration controls to derive information indicating a target data storage class;

comparing the information indicating the target data storage class to the first data storage class information and concluding that the target data storage class and the first data storage class are different; and moving the data object to a data storage device that is a member of the target data storage class.

2. The method of claim 1, where moving the data object to a data storage device includes sending a request from a client system to the database system to move the data object to a data storage device that is a member of the target data storage class.

3. The method of claim 1, further comprising sending a conditional request from a client system to the database system, where the conditional request includes the one or more migration controls and the target data storage class.

4. The method of claim 1, where the first data storage class includes data storage devices that are each slower than each data storage device in the target data storage class.

5. The method of claim 1, where the first data storage class includes data storage devices that are each less expensive than each data storage device in the target data storage class.

6. The method of claim 1, where one migration parameter is a timestamp, indicating the last time the data object was accessed.

7. The method of claim 1, where one migration control is a timestamp table corresponding two or more data storage classes with two or more ranges of timestamp values to indicate one data storage class as the target data storage class for a timestamp.

8. The method of claim 7, where a first range of timestamp values indicate a first data storage class and a second range of timestamp values indicate a second data storage class, and the timestamps in the second range are older than the timestamps in the first range and the second data storage class includes one or more data storage devices that are each slower than each of the data storage devices in the first data storage class.

9. The method of claim 8, where each data storage class in the timestamp table corresponds to a respective timestamp range.

10. The method of claim 1, where one migration parameter is a data size, indicating the size of the data object.

11. The method of claim 10, where one migration control is a data size table corresponding two or more data storage classes with two or more ranges of data size values to indicate one data storage class as the target data storage class for a data size.

12. The method of claim 11, where a first range of data size values indicate a first data storage class and a second range of data size values indicate a second data storage class, and the data sizes in the second range are larger than the data sizes in the first range and the second data storage class includes one or more data storage devices that are each slower than each of the data storage devices in the first data storage class.

13. The method of claim 1, where each migration control is weighted to resolve different results for different migration controls.

14. The method of claim 1, where one migration parameter is a timestamp, indicating the last time the data object was accessed, and one migration parameter is a data size, indicating the size of the data object, and one migration control is a table indexed by timestamp values and data size values to indicate a data storage class as the target data storage class for a timestamp and data size.

15. The method of claim 1, where the data object is moved using a method call to a method of the data object.

16. A method for moving a data object in a database system, wherein the data object includes one or more migration parameters and first data storage class information indicating a class of data storage in which the data object is stored, the method comprising:

receiving the one or more migration parameters;

receiving the first data storage class information indicating the class of data storage in which the data object is stored;

applying the one or more migration parameters for the data object to one or more migration controls to derive information indicating a target data storage class;

comparing the information indicating the target data storage class to the first data storage class information and concluding that the target data storage class and the first data storage class are different; and sending a request from a client system to the database system to move the data object to a data storage device that is a member of the target data storage class.

17. The method of claim 16, where receiving the one or more migration parameters includes sending a request from the client system to the database system for the one or more migration parameters.

18. The method of claim 16, where receiving the first data storage class information includes sending a request from the client system to the database system for the first data storage class information.

19. The method of claim 16, where one migration parameter is a timestamp indicating the last time the data object was accessed, and one migration control is a timestamp table corresponding two or more data storage classes with two or more ranges of timestamp values to indicate one data storage class as the target data storage class for a timestamp.

20. A method for moving a data object in a database system, wherein the data object includes one or more migration parameters and first data storage class information indicating a class of data storage in which the data object is stored, the method comprising:
    receiving a request from a client system for the one or more migration parameters for the data object; and
    receiving a request from the client system to move the data object to a data storage device that is a member of a target data storage class.

21. The method of claim 20, further comprising:
    receiving a request from the client system for the first data storage class information indicating the class of data storage in which the data object is stored; and
    moving the data object to a data storage device that is a member of the target data storage class.

22. The method of claim 20, further comprising:
    comparing the first data storage class information to information indicating the target data storage class and concluding that the target data storage class and the first data storage class are different; and
    moving the data object to a data storage device that is a member of the target data storage class.

23. The method of claim 20, where the data object is moved using a method call to a method of the data object.

24. The method of claim 20, where one migration parameter is a timestamp indicating the last time the data object was accessed.

25. A computer program, stored on a tangible storage medium, for use in moving a data object in a database system, wherein the data object includes one or more migration parameters and first data storage class information indicating a class of data storage in which the data object is stored, the program comprising executable instructions that cause a computer to:
    receive the one or more migration parameters;
    receive the first data storage class information indicating the class of data storage in which the data object is stored;
    apply the one or more migration parameters for the data object to one or more migration controls to derive information indicating a target data storage class;
    compare the information indicating the target data storage class to the first data storage class information and concluding that the target data storage class and the first data storage class are different; and
    send a request from a client system to the database system to move the data object to a data storage device that is a member of the target data storage class.

26. The computer program of claim 25, where the program further comprises executable instructions that cause the computer to send a request from the client system to the database system for the one or more migration parameters.

27. The computer program of claim 25, further comprising executable instructions that cause a computer to send a conditional request from a client system to the database system, where the conditional request includes the one or more migration controls and the target data storage class.

28. The computer program of claim 25, further comprising executable instructions that cause a computer to send a request from the client system to the database system for the first data storage class information.

29. The computer program of claim 25, where the first data storage class includes data storage devices that are each slower than each data storage device in the target data storage class.

30. The computer program of claim 25, where the first data storage class includes data storage devices that are each less expensive than each data storage device in the target data storage class.

31. The computer program of claim 25, where one migration parameter is a timestamp, indicating the last time the data object was accessed.

32. The computer program of claim 25, where one migration control is a timestamp table corresponding two or more data storage classes with two or more ranges of timestamp values to indicate one data storage class as the target data storage class for a timestamp.

33. The computer program of claim 32, where a first range of timestamp values indicate a first data storage class and a second range of timestamp values indicate a second data storage class, and the timestamps in the second range are older than the timestamps in the first range and the second data storage class includes one or more data storage devices that are each slower than each of the data storage devices in the first data storage class.

34. The computer program of claim 33, where each data storage class in the timestamp table corresponds to a respective timestamp range.

35. The computer program of claim 25, where one migration parameter is a data size, indicating the size of the data object.

36. The computer program of claim 35, where one migration control is a data size table corresponding two or more data storage classes with two or more ranges of data size values to indicate one data storage class as the target data storage class for a data size.

37. The computer program of claim 36, where a first range of data size values indicate a first data storage class and a second range of data size values indicate a second data storage class, and the data sizes in the second range are larger than the data sizes in the first range and the second data storage class includes one or more data storage devices that are each slower than each of the data storage devices in the first data storage class.

38. The computer program of claim 25, where each migration control is weighted to resolve different results for different migration controls.

39. The computer program of claim 25, where one migration parameter is a timestamp, indicating the last time the data object was accessed, and one migration parameter is a data size, indicating the size of the data object, and one migration control is a table indexed by timestamp values and data size values to indicate a data storage class as the target data storage class for a timestamp and data size.

40. The computer program of claim 25, where the data object is moved using a method call to a method of the data object.

41. A database system, comprising:
    one or more data storage facilities for use in storing data composing records in tables of a database, where at least one data storage facility includes at least two types of data storage devices each belonging to a respective data storage class, and at least one data storage facility stores one or more data objects, each of the data objects including one or more migration parameters and first data storage class information indicating a class of data storage in which each of the data objects is stored;
    one or more processing modules configured to manage the data stored in the data-storage facilities and to move data objects among data storage devices in different data storage classes according to the migration parameters and the first data storage class information; and a database management component configured to coordinate the operation of the processing modules.

42. The database system of claim 41, where the database management component and a processing module operate together to move a data object to a data storage device that is a member of a target data storage class in response to a request from a client system.

43. The database system of claim 41, where the data storage classes include six classes: very fast, fast, normal, slow, very slow, extremely slow; and where each data storage class includes zero or more respective data storage devices.

44. The database system of claim 41, where a data storage facility includes a ramdisk as one type of data storage.

45. The database system of claim 41, where a data storage facility includes a hard disk as one type of data storage.

46. The database system of claim 41, where a data storage facility includes a tape silo as one type of data storage.

47. The database system of claim 41, where a data storage facility includes a data reference as one type of data storage, where the data reference indicates a remote storage location outside the data storage facility.

48. The database system of claim 47, where the remote storage location is a data storage device within the database system and is accessible from multiple database storage facilities within the database system.

49. The database system of claim 47, where the remote storage location is a data storage device outside the database system and is accessible across a network connection.

* * * * *